United States Patent [19]

Dixon et al.

[11] 3,752,980
[45] Aug. 14, 1973

[54] APPARATUS FOR MEASURING ELECTROLUMINESCENT DEVICE PARAMETERS

[75] Inventors: Richard Wayne Dixon, Morristown; James Michael Ralston, North Plainfield; Walter Rosenzweig, West Orange, all of N.J.

[73] Assignee: Bell Telephone Laboratories, Incorporated, Murray Hill, Berkeley Heights, N.J.

[22] Filed: May 30, 1972

[21] Appl. No.: 257,582

[52] U.S. Cl......250/552, 307/311, 324/27, 250/206
[51] Int. Cl..................... G01n 21/16, H03k 3/42
[58] Field of Search................... 250/211 J, 217 SS, 250/71; 324/158 T, 20, 27; 307/311

[56] References Cited
UNITED STATES PATENTS
3,603,833  9/1971  Logan................................ 307/311
3,525,942  8/1970  Boranky et al. ..................... 307/311
2,980,853  4/1961  Kline et al........................ 324/158 T Primary Examiner—Harold A. Dixon
Attorney—W. L. Keefauver

[57] ABSTRACT

Apparatus and method for measuring output characteristics of an electroluminescent device as a function of the amplitude of an input current pulse. The pulse duty factor and pulse amplitude of the input current to the electroluminescent device are varied to maintain a constant time-averaged input current such that the magnitude of the time-averaged light output radiant flux is a function essentially only of the input current pulse amplitude.

12 Claims, 5 Drawing Figures

APPARATUS FOR MEASURING ELECTROLUMINESCENT DEVICE PARAMETERS

BACKGROUND OF THE INVENTION

This invention relates generally to the testing of electroluminescent devices; and, more particularly, to apparatus and method for determining output characteristics of an electroluminescent device. Important output characteristics which can thus be measured include: quantum efficiency, output watts per input amperes, and output lumens per input amperes.

An important parameter of a practical electroluminescent light source is its quantum efficiency. In many electroluminescent device systems, such as red and green emitting gallium phosphide and red-emitting gallium arsenide phosphide, this parameter varies significantly over the range of typical device currents. A characterization of the quantum efficiency must therefore involve measurements at several different current amplitudes.

Known prior art methods typically have applied input pulses of different amplitude, but have not maintained a constant time-averaged input current. As a result of not maintaining a constant time-averaged input current, recalibration of the measuring apparatus was required for each different amplitude of input current. Such a measuring set was described, for example, by J. S. Jayson and R. J. Strain in an article entitled "Test Set to Evaluate the Electroluminescent Efficiency of Noncontacted GaP Diodes", appearing in Review of Scientific Instruments, Vol. 40, page 956, 1969. Since recalibration is time-consuming and therefore costly, an object of this invention is to make convenient output characteristic measurements.

More specifically, it is an object of this invention to measure a particular output characteristic of a plurality of electroluminescent devices at a plurality of input current amplitudes with it being sufficient to calibrate the apparatus at only one input current amplitude for each device.

SUMMARY OF THE INVENTION

To these ends, output characteristics of an electroluminescent device are measured in accordance with the invention as a function of the amplitude of a plurality of input pulses, which are varied suitably to maintain a constant time-averaged input current. The constant time-averaged input current applied to the electroluminescent device advantageously is achieved by adjusting the repetition rate of the input current pulses with respect to the amplitude of the pulses. The current pulses are then applied to the device so that the device produces a light output. Next, this light output is converted into a current output by a photodetector. In turn, the current output of the photodetector is applied to a time-averaging circuit so that a time-averaged output current proportional to the light output is generated. Then the time-averaged current output is applied to a voltage detector. After an initial calibration, the voltage detector indicates the magnitude of the desired output characteristic at each of a plurality of input pulse amplitudes.

An important relationship in the operation of the circuit is that since the time-averaged current through the electroluminescent device is fixed, the magnitude of the device's output characteristics are a function essentially only of the peak pulse amplitude of the input current pulse train. Important output characteristics which can thus be measured include: quantum efficiency, output watts per input amperes and output lumens per input amperes.

However, because the invention is particularly useful in measuring the quantum efficiency of light emitting diodes such measurement will be described in the detailed description of an illustrative embodiment. Of course, it is understood that this is not a limitation upon the invention, and is merely illustrative of the general principles of the invention.

DETAILED DESCRIPTION

Figure 1:
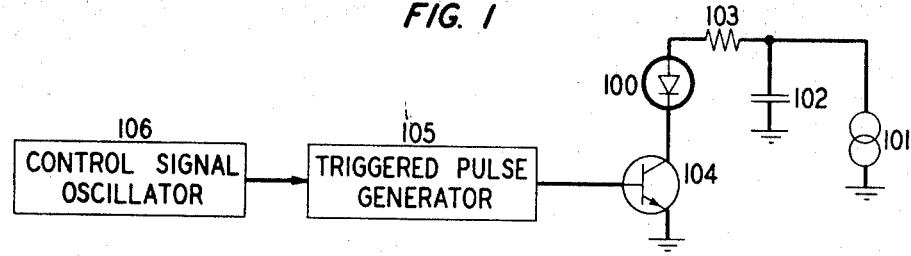
FIG. 1 shows a schematic, partly block, diagram of a circuit for applying a pulsed current input with a constant time-average to an electroluminescent device in accordance with this invention.

With reference now to the drawing, FIG. 1 shows a schematic diagram of the electroluminescent device input excitation circuit in accordance with this invention. As shown, a current source 101 is connected in parallel with a capacitor 102. In parallel with capacitor 102 is connected a series circuit including a resistor 103, an electroluminescent device 100 and the output branch of a transistor 104. The base terminal of the transistor 104 is connected to the output of a triggered pulse generator 105 which is adapted to provide an approximately rectangular waveform output pulse of constant width. The input of pulse generator 105 is connected to the output of an oscillator 106 which provides a control signal to trigger pulse generator 105.

In accordance with this invention the circuit of FIG. 1 is adapted such that in operation approximately rectangular input current pulses are applied to the electroluminescent device 100 and the repetition rate of the input pulses is adjusted with respect to the amplitude thereof so that on a time-averaged basis the input current is constant. During operation of the circuit, transistor 104 is used essentially as a switch, and as such, typically, is driven so as to be either saturated or nonconducting. When transistor 104 is nonconducting, current source 101 charges capacitor 102; and no current flows through the electroluminescent device. When transistor 104 conducts, capacitor 102 discharges through the series combination of resistor 103, electroluminescent device 100 and transistor 104. The magnitude of the current pulse through electroluminescent device 100 depends partially upon the length of time that capacitor 102 was charging. Since no time-averaged current may flow through capacitor 102, the magnitude of the time-averaged current through electroluminescent device 100 must be the magnitude of the current from current source 101.

The switching of transistor 104 is determined by the input to the base terminal of the transistor. To this end, the base terminal is connected to the output of a triggered pulse generator 105 which is adapted to provide an approximately rectangular waveform output pulse of constant width when a control signal is applied to its input. The amplitude of the approximately rectangular output pulse from pulse generator 105 advantageously is such that the transistor is saturated for the duration of the pulse. In the absence of a pulse, the amplitude of the output of pulse generator 105 is such that the transistor is nonconducting.

The control signal that was mentioned as the input to pulse generator 105 is the output of oscillator 106. The frequency of the control signal is varied in order to vary the repetition rate of the output pulse of pulse generator 105, which, in turn, varies the switching rate of transistor 104 and therefore the repetition rate, and, concomitantly, the amplitude, of the input current pulse to electroluminescent device 100.

Figure 2:
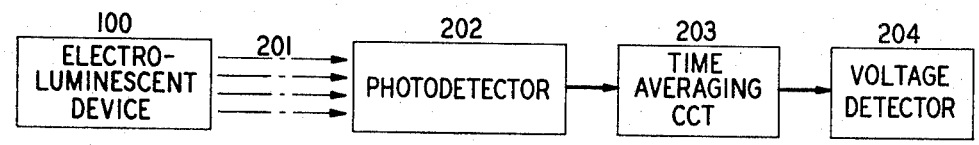
FIG. 2 shows a block diagram of the elements of a circuit to detect the output of the electroluminescent device in accordance with this invention.

Before describing more specifically particular pulse generator and oscillator circuitry, it is believed the following general discussion of the output and detection functions will be helpful in understanding the invention. To this end, FIG. 2 shows a block diagram of the signal flow from the electroluminescent device to a calibrated voltage detector output in accordance with this invention. As shown, electroluminescent device 100 produces light output, indicated by dashed arrows 201, which is detected by a photodetector 202. The output of photodetector 202 is connected to the input of a time-averaging circuit 203. The output of time-averaging circuit 203 is in turn connected to the input of a voltage detector 204.

During the testing of electroluminescent device 100, an input current pulse is applied to electroluminescent device 100 in accordance with the input circuit of FIG. 1 and the device produces light output 201. This light output is converted into a current output by photodetector 202. The current output of photodetector 202 is applied to time-averaging circuit 203 so that a time-averaged output current proportional to light output 201 is generated. Finally, the time-averaged current output is applied to voltage detector 204. Because the time-averaged current through electroluminescent device 100 is fixed, the time-averaged current output of the electroluminescent device reflects directly the dependence of the device's output characteristics on the current amplitude corresponding to the peak pulse amplitude of the input current pulse train. After an initial calibration, voltage detector 204 indicates the magnitude of an output characteristic directly. Calibration is accomplished by using, as the test electroluminescent device, an electroluminescent device with a known output characteristic and adjusting the output of time-averaging circuit 203 so that voltage detector 204 indicates the magnitude of the known output characteristic. The electroluminescent device with the known output characteristic is then removed and a test device is connected in order to determine the output characteristic of the test device.

Figure 3:
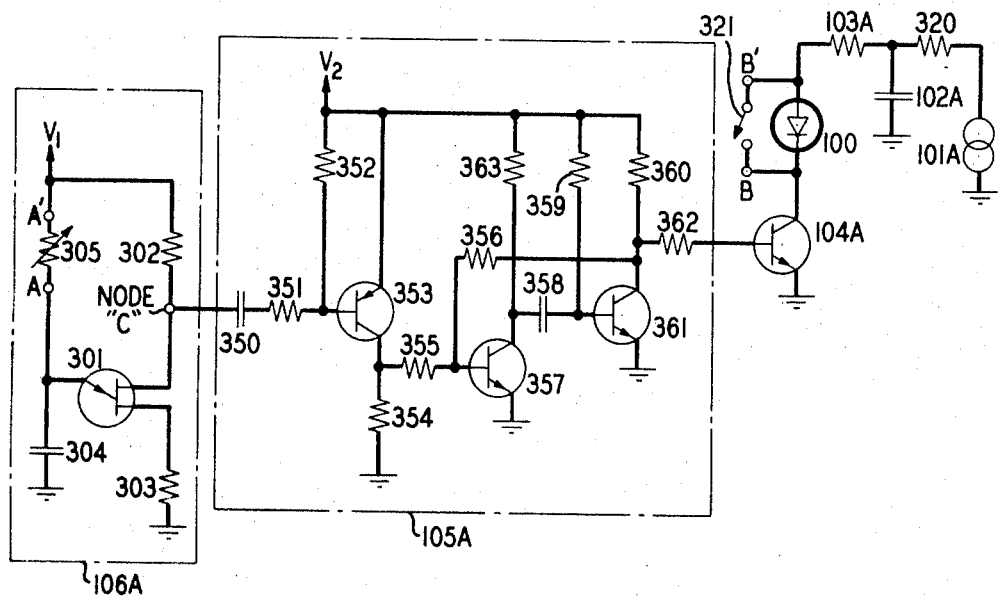
FIG. 3 illustrates a more specific schematic diagram of a circuit suitable for providing input current to a test electroluminescent device and also illustrates the connection of the test electroluminescent device within the circuit in accordance with this invention.

With reference now to FIG. 3, there is shown a schematic diagram of a more specific electroluminescent device excitation circuit appropriate for use in accord with this invention. The circuitry within broken-line rectangle 106A corresponds to control signal oscillator 106 of FIG. 1; and the circuitry within broken line rectangle 105A corresponds to triggered pulse generator 105 of FIG. 1. In the circuitry connected to the output of pulse generator 105A, a transistor 104A corresponds to transistor 104 of FIG. 1, a resistor 103A corresponds to resistor 103 of FIG. 1, a capacitor 102A corresponds to capacitor 102 of FIG. 1, a current source 101A corresponds to current source 101 of FIG. 1, and electroluminescent device 100 remains unchanged. The two additions to this circuitry connected to the output of pulse generator 105A are a switch 321 connected between nodes B and B' and a resistor 320 connected between current source 101A and a node between resistor 103A and capacitor 102A. The purpose of switch 321 is to provide a low resistance connection between nodes B and B' in order to prevent excessive charging of capacitor 102A when the circuit of FIG. 3 is not being used to test a device and there would otherwise be an open circuit between nodes B and B'. Resistor 320 provides a means of measuring the magnitude of current source 101A. That is, since the magnitude of resistor 320 is known, a measurement of the voltage drop across resistor 320 allows computation of the magnitude of current source 101A.

Turning now to the circuitry within broken line rectangle 106A, there is shown the source electrode of a unijunction transistor 301 connected to a voltage source, denoted $V_1$, through a resistor 302. The drain electrode of unijunction transistor 301 is connected to ground through a resistor 303; and the base is connected both to ground through a capacitor 304 and to voltage source $V_1$ through a variable resistance 305 which is connected between nodes A and A'. A capacitor 350 is connected between the source electrode of transistor 301 and a resistor 351. Capacitor 350 forms the input to the triggered pulse generator circuitry within broken line rectangle 105A.

The discussion of the operation of the control signal oscillator, contained in broken line rectangle 106A, begins with transistor 301 in a nonconducting state. As capacitor 304 charges through resistor 305, the base of transistor 301 becomes more and more positive until the transistor finally begins to conduct. When transistor 301 begins to conduct, the voltage on node C is rapidly reduced providing an input for pulse generator 105A; and capacitor 304 begins to discharge through transistor 301. Capacitor 304 continues to discharge until the base terminal of transistor 301 falls to a value which turns off that transistor. This sequence is repeated again and again, so that the output of the oscillator is a train of approximately triangular pulses. The frequency of the oscillator is determined by the joint action of capacitor 304 and variable resistor 305. These oscillator output pulses trigger pulse generator 105A to produce an approximately rectangular output pulse whose amplitude can drive transistor 104A into saturation and whose width is constant.

Moving on to the circuitry contained within broken line rectangle 105A, there is shown the input capacitor 350 connected to resistor 351 which in turn is connected to the base of a conventional PNP bipolar transistor 353. The base of transistor 353 is also connected through a resistor 352 to a voltage source $V_2$; the emitter is connected directly to the voltage source $V_2$; and the collector is connected to ground through a resistor 354. The collector of transistor 353 is also connected through a resistor 355 to the base of a conventional NPN bipolar transistor 357. The emitter of transistor 357 is connected to ground; the collector is connected both to $V_2$ through a resistor 363 and to the base of another conventional NPN bipolar transistor 361 through a capacitor 358. The base of transistor 361 is also connected to $V_2$ through a resistor 359; the emitter is connected to ground; and the collector is connected to $V_2$ through a resistor 360, to the base of transistor 357 through a resistor 356, and to the base of transistor 104A through a resistor 362.

The purpose of the pulse generator 105A is to form, when triggered by oscillator 106A, an approximately rectangular output pulse which will advantageously saturate transistor 104A. Within the pulse generator, transistor 353 and its associated resistors 351, 352, 354, 355 act as an amplifier. A negatively going pulse from node C is capacitively coupled to the base of transistor 353 which is then advantageously saturated. This results in a positive going pulse at the collector of transistor 353, which is then resistively coupled to the base of transistor 357. Transistors 357 and 361 act jointly as part of a one-shot multivibrator, with transistor 357 normally non-conducting and transistor 361 normally saturated. Transistor 361 is maintained saturated by a current flowing to its base through resistor 359; and accordingly, its collector is then near zero volts, as is the base of normally non-conducting transistor 357.

When the previously mentioned positive going pulse is coupled to the base of transistor 347, the transistor advantageously saturates. The collector of transistor 357 then impresses a near zero voltage onto the base of transistor 361 by discharging capacitor 358, and thus makes transistor 361 non-conducting. Accordingly, the output at the collector of transistor 361 then rises toward $V_2$ and forms the beginning of the output pulse of pulse generator 105A. Meanwhile, capacitor 358 is recharging through resistor 359. When capacitor 358 is recharged, transistor 361 is again saturated and the output of transistor 361 has again dropped to near zero. At the same time, transistor 357 has again become non-conducting and the circuit has returned to its normal state.

Referring again to the remaining circuitry of FIG. 3, electroluminescent device 100 under test is connected to the collector of transistor 104A. During operation of this branch of the circuit, the magnitude of the average current through the test device is determined by the magnitude of the d-c current source 101A. The current is formed into pulses by the cooperating action of transistor 104A and capacitor 102A. Transistor 104A is gated by constant width pulses of varying repetition rate, through resistor 362, and this causes capacitor 102A to charge while the transistor is not conducting and the capacitor to discharge through device 100 while the transistor is conducting. The RC time constant of resistor 103A and capacitor 102A is made to be very long in comparison to the conduction period of the transistor so that the current pulses may be considered to be of constant amplitude over their duration. Determining the current magnitudes, the pulsed current $I_p$, is then equal to the average d-c current $I_{DC}$, divided by a duty factor. The duty factor is defined as the ratio of the duration of the pulse to the time from the start of one pulse until the start of the next pulse. This can be expressed by:

$$I_p = I_{DC}/Duty\ Factor = I_{DC}/(f)\ (w)$$

where $f$ is the pulse repetition rate and $w$ is the pulse width.

Figure 3A:
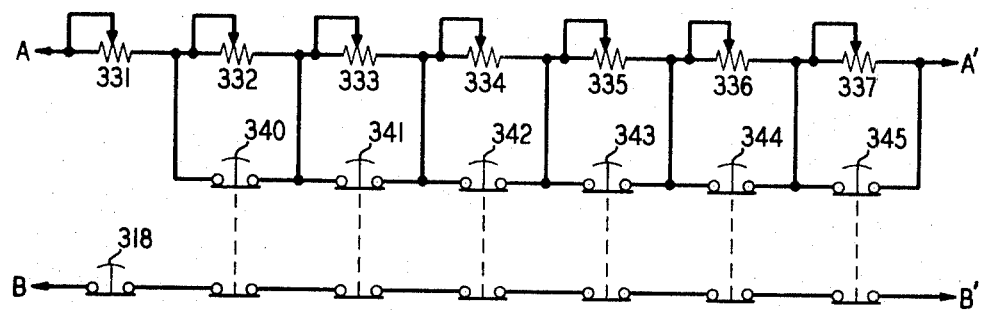
FIG. 3A illustrates a schematic diagram of a typical circuit which can be used between nodes A and A' and between nodes B and B' of FIG. 3 in accordance with this invention.

Modification to the circuitry in FIG. 3 can, of course, be made in order to increase convenience when testing devices. FIG. 3A shows the elements of the presently preferred alternative for use as variable resistor 305 connected between nodes A and A' and switch 321 connected between nodes B and B', both shown in FIG. 3. These elements include variable resistances 331 through 337, normally-closed double-pole switches 340 through 345 which are disposed as shown, and a switch 318. The variable resistance between A and A' includes seven serially connected variable resistors 331–337; of these, resistors 332–337 are normally shorted by a plurality of normally-closed double-pole switches 340–345. When resistors 332–337 are shorted the only resistance connected between A and A' is resistor 331, which then determines the minimum resistance between nodes A and A' and therefore the maximum oscillation frequency of the control signal oscillator 106A. Depressing one of the normally closed switches 340–345 increases the resistance between nodes A and A' and thus lowers the oscillation frequency.

FIG. 3A also shows the connection of a low resistance path between nodes B and B'. When it is desired to test a device one of switches 318, 340–345 is depressed and thus there is no low resistance path between nodes B and B'. Depressing the switch also connects the desired resistance between nodes A and A'. For example, if it is desired to have only resistor 331 connected between node A and A' then switch 318 is depressed; if it is desired to have both resistors 331 and 332 connected then switch 340 is depressed; depressing switch 341 connects resistors 331 and 333.

In order to prepare the circuit in FIG. 3 for the testing of electroluminescent devices, it is necessary to make an initial adjustment of the test currents. First, the magnitude of the d-c current source is adjusted while measuring the voltage drop across resistor 320. Since the value of resistor 320 is known the voltage drop corresponding to the desired current can be computed. Second, the same technique is used and the pulsed current magnitudes are set by adjusting each of the appropriate resistances 331–337 in turn while measuring the voltage drop across resistor 103A. If a one milliampere d-c current source is used, it has been found convenient to use the pulse current magnitudes of 1–2–5–10–20–50–100 mA. Furthermore, if a d-c current source of 1 mA is used, the ohmic heating effects within the device are minimized because the time-averaged electroluminescent device current is maintained at only 1 mA, regardless of the pulse amplitude selected. A typical pulse width for the input current pulse is approximately 12.5 microseconds. Typical pulse repetition rates which would be used in conjunction with this pulse width and the range of pulse current magnitudes mentioned previously include a range of from 800 to 80,000 hertz.

The output and detection circuit shown in FIG. 4 will now be discussed in greater detail than was possible in connection with FIG. 2. Nevertheless, the circuitry in FIG. 4 corresponds to the functional blocks in FIG. 2.

For example, the circuitry within broken-line rectangle 202A corresponds to photodetector 202 of FIG. 2; and the circuitry within broken-line rectangle 203A corresponds to time-averaging circuit 203 of FIG. 2. Voltage detector 204 remains unchanged; and electroluminescent device 100 remains unchanged, but has been placed within a reflector 400, advantageously adapted for directing or focusing the light output onto photodetector 202. Light output is indicated by dashed arrows 201A. As shown, a photodiode 401 is connected to an operational amplifier 402, which has a feedback loop including a capacitor 408 and variable resistors 406 and 407. Initial calibration or "zeroing" of amplifier 402 is provided by a resistor 403 and voltage sources 404 and 405. Typically voltage sources 404 and 405 are of equal magnitude and opposite polarity, for example, ± 15V. The output of operational amplifier 402 is connected to a voltage detector 204. Connection 410 between photodiode 401 and operational amplifier 402 and a connection 411 between operational amplifier 402 and voltage detector 204 advantageously employ coaxial cable to minimize information loss.

Figure 4:
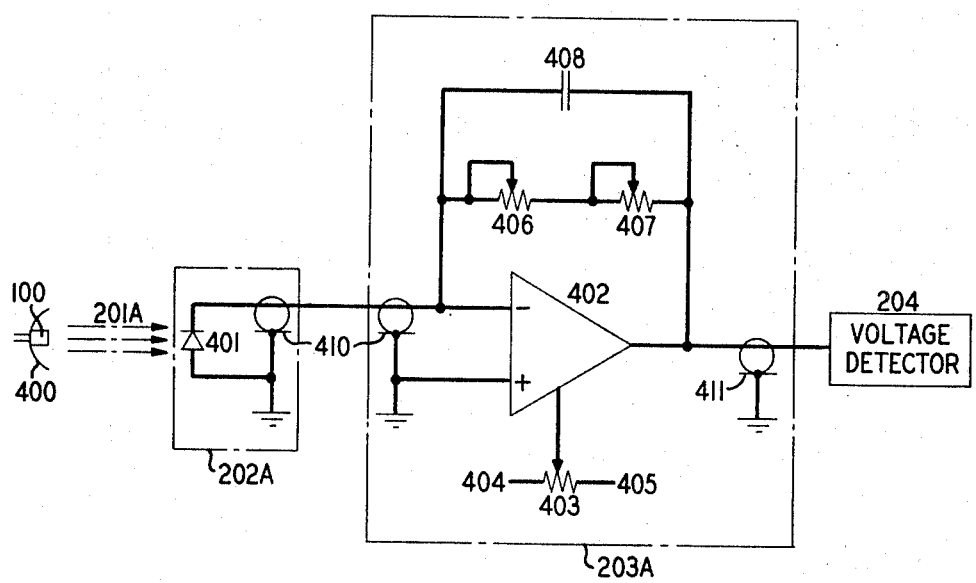
FIG. 4 illustrates a schematic diagram of a typical detection and output circuit including the connection of a photodetector and a voltage detector in accordance with this invention.

During operation of the cirucit in FIG. 4, light output 201A is directed or focused by reflector 400 upon photodiode 401 which generates a current proportional to the light. The current output of photodiode 401 is time-averaged by operational amplifier 402, for example, a Philbrick-Nexus Model 1701, operating in the inverting mode. Feedback is provided by two resistors 406 and 407, acting in combination with capacitor 408. Coarse adjustment of the magnitude of the feedback is obtained by using, for example, a one million ohm value for resistor 406 and fine adjustment is obtained by using, for example, a 50,000 ohm value for resistor 407. It was already mentioned that during the initial calibration of the output and detection circuitry of FIG. 2 the output of time-averaging circuit 203 was adjusted so that the voltage detector 204 indicated the correct value of the output characteristic being measured. In particular, this is accomplished in the circuit of FIG. 4 by adjusting feedback resistors 406 and 407 so that voltage detector 204 indicates the correct value of the output characteristic being measured. Important output characteristics for which resistors 406 and 407 can be adjusted include quantum efficiency, output watts per input amperes, and output lumens per input amperes.

Various modifications and variations will no doubt occur to those skilled in the various arts to which this invention pertains. For example, while adjustment of the duty cycle has been achieved through adjustment of the repetition rate of the input current pulses, it is also possible to adjust the duty cycle by adjusting the width of the input current pulse, or by adjusting both the width and the repetition rate of the input current pulse. Because adjusting only the repetition rate reduces the heating effect of the input current it is the presently preferred alternative. These and all other variations which basically rely on the teachings through which this disclosure has advanced the art are properly considered within the scope of this invention.

What is claimed is:

1. In apparatus for measuring, at a plurality of input current amplitudes, output characteristics of an electroluminescent device comprising: means for applying successively a plurality of differing amplitude input current pulses to an electroluminescent device, and means for detecting the light output of the electroluminescent device;

the improvement being:
means included in the input current means for adjusting the amplitude of the input pulses and adjusting the duty cycle of the input pulses with respect to the amplitude thereof such that on a time-averaged basis the input current is constant; and
means included in the detection means for providing a time-averaged output current proportional to the light output.

2. Apparatus as recited in claim 1 wherein the means for adjusting the duty cycle comprises means for adjusting the repetition rate of the input current pulses.

3. Apparatus as recited in claim 1 wherein the means for providing the time-averaged output current comprises:
a photodetecting device having a current output proportional to the light output of the electroluminescent device,
a time-averaging circuit having an input and output node, the input node being connected to the output of the photodetector, and
a voltage detector having an input node which is connected to the output node of the time-averaging circuit.

4. Apparatus as recited in claim 1 wherein the means for providing the input current pulses comprises:
a first series circuit branch including a current source and a capacitor,
a second series circuit, in parallel with the capacitor of the first circuit branch, comprising a resistor, the electroluminescent device and the output branch of a transistor,
a triggered pulse generator for generating approximately rectangular output pulses and having an input and an output node, the output node being connected to the input branch of the transistor,
an oscillator having an output node connected to the input node of the triggered pulse generator, and
means for varying the frequency of the oscillator to vary the duty cycle and amplitude of the input current to the electroluminescent device.

5. Apparatus as recited in claim 4 wherein the means for varying the frequency of the oscillator comprises:
a variable resistance connected within the oscillator to determine the frequency of oscillation, and
means for varying only said variable resistance to vary the frequency of the oscillator.

6. In a method for measuring output characteristics of an electroluminescent device at a plurality of input current amplitudes comprising applying successively a plurality of differing amplitude input current pulses to an electroluminescent device, and detecting the light output, the improvement being the steps of:
adjusting the amplitude of the input pulses and adjusting the duty cycle of the input pulses with respect to the amplitude thereof such that on a time-averaged basis the input current is constant, and
detecting the light output and generating a time-averaged output current proportional thereto.

7. A method as recited in claim 6 wherein the adjustment of the duty cycle is provided by adjusting the repetition rate of the input current pulses.

8. A method as recited in claim 6 wherein the time-averaged output current is provided by the steps of:

directing the light output of the electroluminescent device upon a photodetecting device, and applying the current output of the photodetecting device to a time-averaging circuit.

9. A method as recited in claim 6 wherein the input current pulses are provided by:

applying a current from a constant current source to a capacitor, deriving a current from the capacitor, applying the current from the capacitor to a series circuit comprising a resistor, the electroluminescent device and the output branch of a transistor, and applying to the input branch of the transistor the output of a triggered pulse generator adapted for generating approximately rectangular output pulses sufficient that in the presence of a pulse generator output pulse the transistor is saturated, and in the absence of said pulse generator output pulse the transistor does not conduct current.

10. A method as recited in claim 9 wherein the variation in duty cycle of the pulse generator pulse is provided by:

applying the output of an oscillator to the input of the pulse generator; and varying the frequency of oscillation of the oscillator so that the duty cycle of the pulse generator varies accordingly.

11. A method as recited in claim 6 wherein the output characteristics are provided by:

applying the time-averaged output current to a voltage detector, and calibrating the voltage detector for each output characteristic so that the indicated voltage corresponds to at least one of the following device output characteristics:

quantum efficiency, output watts per input amperes, and output lumens per input amperes.

12. A method as recited in claim 11, wherein the calibration of the voltage detector to read an output characteristic is provided by:

connecting an electroluminescent device of a known output charcteristic in place of the test electroluminescent device, and adjusting the output of the time-averaging circuit so that the voltage detector reads the value of the known output characteristic.

* * * * *